United States Patent [19]

Benko et al.

[11] Patent Number: 4,895,884

[45] Date of Patent: Jan. 23, 1990

[54] RUBBER CONTAINING MICROENCAPSULATED ANTIDEGRADANTS

[75] Inventors: David A. Benko, Munroe Falls; Larry R. Evans, Seville; James G. Gillick, Akron; Walter H. Waddell, Fairlawn; Barbara A. Metz, Baltimore; Benjamin F. Benton, Centerburg; Gordon E. Pickett, Reynoldsburg; William R. Krumm, Reynoldsburg, all of Ohio

[73] Assignee: The Goodyear Tire & Rubber Company, Akron, Ohio

[21] Appl. No.: 104,893

[22] Filed: Oct. 6, 1987

[51] Int. Cl.[4] ............................ C08K 5/34; C08K 5/13
[52] U.S. Cl. ...................................... 523/207; 524/91; 524/99; 524/102; 524/103; 524/291; 524/336; 524/571
[58] Field of Search ................. 524/571, 91, 99, 102, 524/103, 291, 336; 523/202, 206, 207; 525/902

[56] References Cited

U.S. PATENT DOCUMENTS

| | | | |
|---|---|---|---|
| 4,419,471 | 12/1983 | Nelsen et al. | 525/902 |
| 4,530,880 | 7/1985 | Taniuchi et al. | 523/207 |
| 4,601,863 | 7/1986 | Shioi et al. | 503/213 |

FOREIGN PATENT DOCUMENTS 1551499  8/1979  United Kingdom .

OTHER PUBLICATIONS

Database Chemical Abstracts, (HOST:STN), 1984, No. 101 (3): 19081c, Columbus, Ohio U.S.: & JP-A-50 20 209 (HOKKO Chemical Industry Co., Ltd.) 01-0-2-1984.
Database WPIL, No. 87-105752, Derwent Publications Ltd., London GB; & JP-A-62 053 786 (Asahi Chemical Ind. K.K.) 09-03-1987.

Primary Examiner—John Kight
Assistant Examiner—Nathan M. Nutter
Attorney, Agent, or Firm—Bruce J. Hendricks; D. O. Nickey

[57] ABSTRACT

There is disclosed the use of microencapsulated antidegradants in rubber and a process for the production of microencapsulated antidegradants. More specifically, this invention is directed to the cellulose acetate microencapsulation of para-phenylene diamine based antiozonants at wall to core ratios greater than 1:1 but less than 4:1. The microcapsules preferably have a particle diameter of less than 50 microns. The microencapsulated antidegradant prepared and used according to this invention provides long term protection to rubber articles that are subject to ozone and oxygen attack.

9 Claims, No Drawings

RUBBER CONTAINING MICROENCAPSULATED ANTIDEGRADANTS

Technical Field

This invention relates to the enhanced protection of rubbers from oxidative degradation and ozonolysis. Specifically, this invention relates to the microencapsulation of rubber antidegradants and their use in rubbery polymers.

BACKGROUND ART

The use of rubber articles has always been subject to the problem of oxygen and ozone induced degradation. Over the years numerous solutions have been proposed to lessen or eliminate the destruction of the rubbery polymers by attack from ozone and/or oxygen, including the use of chemical antidegradants to prevent or lessen the degradation of polymers subject to attack by oxygen and ozone. More recently, several new approaches have been submitted to further enhance a rubber's ability to resist ozone and oxygen degradation. These new approaches include higher molecular weight materials, polymer bound materials and specific blends of antioxidants and/or antiozonants with waxes, rosins and the like. One problem that the prior art approaches have failed to solve is that the antiozonant at the rubber article surface is depleted after several years of service. This is especially true of articles such as truck tires that may be recapped or retreaded three or more times. In such use the rubber, especially the tire sidewall, must maintain extended antiozonant protection so that the tire carcass may be used to its fullest potential.

In general, the approach of this invention is to place the antidegradant in a capsule with specific wall to core ratios wherein the capsule has a diameter of 50 microns or less. The use of a microencapsulated antidegradant provides or releases additional antidegradant to the rubber compound to compensate for or replace the depleted or consumed antidegradant. Through the use of encapsulated antidegradants, the effective service life of a rubber article is greatly enhanced.

A microcapsule is a particle or droplet of one material encased in a protective wall of a different material; however, the core material may also be dispersed throughout the wall polymer. The resulting particle or droplet interacts with its environment differently than the noncoated particle or droplet ordinarily does. Generally, microcapsules range in size from about 3 millimeters down to a few micrometers (microns) or even less. As used herein, the term microcapsule means a capsule that may have one or several nuclei; that is, one or several droplets or particles may be incorporated into a single microcapsule. The capsule core may be liquid, solid, a solid suspended in liquid or one liquid dispersed in a second liquid. One very common application of microcapsule technology is in carbonless paper.

One benefit of encapsulation is that it can facilitate handling. For example, an encapsulated liquid may be handled much like a free flowing powder. Encapsulation provides for controlled release of the core material which may actually reduce the amount of active ingredient needed to do the job. With certain pharmaceuticals, encapsulation has been used to sustain a minimum effective dose level for extended periods of time: i.e., Contac TM cold medication.

Through extensive research and effort, the inventors herein have developed an encapsulation method, raw materials and other parameters that provides superior protection to rubber articles from oxygen and ozone attack.

Over the past 25 years a wide variety of methods and processes for encapsulating materials have been developed. Some of these, such as the fluidized bed process and spray drying, were adapted from equipment and processes already in use for other purposes. Others, such as phase separation and coacervation, were developed specifically for microencapsulation. These varied processes provide different techniques for producing capsules of varying sizes, alternative materials for the composition of the capsule cell or wall and various functional materials within the capsule. Some of these various processes are shown in U.S. Pat. Nos. 3,516,846, 3,516,941, 3,778,383, 4,087,376 and 4,251,386. It is known that a wide variety of different materials may be used in making the capsule walls including gelatin and synthetic polymeric materials. A variety of capsule forming materials are disclosed, for example, in U.S. Pat. Nos. 3,516,846, and 4,087,376.

The microencapsulated antidegradant of this invention is prepared by a spray drying technique. Typically spray dried microcapsules range in size from 3 to 80 microns. These microcapsules can be mononuclear or polynuclear. The wall material is typically 25 to 80% or more of the total product weight.

Conventionally, in the spray drying technique, the material to be encapsulated and the coating material are fed into the top of the drying chamber through an atomizing device. A high volume, high velocity flow of air is fed in and around the atomizer. The solvent is flash evaporated from the small droplets or with hot melt systems, the droplets are rapidly frozen. The air stream with the dry or hardened microcapsules passes into a cyclone separator where the product is separated from the exhaust air stream and collected. In the spray drying technique, the use of particular solvents, polymer concentrations, droplet size, solution viscosities and other variables are important considerations in the production of a suitable microcapsule.

The Applicants have discovered that the preparation of a microencapsulated antiozonant as described and claimed herein will survive Banbury mixing at temperatures in excess of 110° C. and survive the curing process which achieves temperatures in excess of 150° C. Further, it was unexpectedly observed that the microcapsules prepared according to this invention were compatible with rubber formulations, and did not interfere with the curing or vulcanization of the rubber and did not adversely impact the physical properties of the rubber vulcanizate. In addition, it was discovered that encapsulation of the antiozonant, in accordance with this invention, affected the rate at which the antiozonant became available for consumption at the surface of the rubber article and therefore greatly extends the effective lifetime of the rubber article. The prior art does not suggest, disclose, or contemplate the advancement to the state of the art as recited and claimed herein.

DISCLOSURE OF THE INVENTION

There is disclosed a composition comprising a diene containing polymer and a microencapsulated antidegradant: wherein the walls of the microcapsule are formed of a polymer selected from the group comprising cellulose acetates and chlorinated rubbers: and wherein said microencapsulated antidegradant has a diameter of 50 microns or less and wall to core ratio of from 1:1 to 4:1 by weight.

There is also disclosed a process for the preparation of a microencapsulated antidegradant which comprises admixing an antidegradant with an encapsulating polymer selected from the group comprising cellulose acetate and chlorinated rubbers which are dissolved in a solvent selected from methylene chloride, methyl ethyl ketone, acetone, butanol, 4-hydroxy-4-methyl-2-pentanone and mixtures thereof at weight ratios of encapsulating polymer to antidegradant of from 1:1 to 4:1 and spray drying the mixture.

There is further disclosed an improved rubber vulcanizate, said rubber vulcanizate is prepared by combining:

(A) a vulcanizable diene containing elastomer with a microencapsulated antidegradant, said microencapsulated antidegradant being prepared by a process comprising:

(1) admixing the antidegradant with an encapsulating polymer;

(2) spray drying the resulting mixture:

(3) isolating the microencapsulated antidegradant;

(B) curing the vulcanizable diene elastomer/microencapsulated antidegradant mixture.

The wall to core ratios of the microcapsules are an important aspect to the invention. Wall to core ratios of 1:1 to 4:1 by weight have been found adequate, with ratios of 2:1 to 3:1 by weight being preferred. Wall to core ratios above 4:1 excessively dilute the antiozonate while ratios of less than 1:1 show little or no improvement over the free antiozonate.

The rubber antidegradants that may be encapsulated include all those presently known and used in the rubber industry. The major classes of antidegradants are the phenolics, phosphites, thioesters, amines, quinolines and materials which combine these functional groups. The phenolic class retards oxidation by the chain breaking mechanism. This class can be divided into the subgroups of monophenols, bisphenols and thiobisphenols, polyphenols and hydroquinone derivatives. Representative of the phenolics are compounds such as 2,6-di-t-butyl-4-methylphenol, butylated hydroxytoluene, 2,2'-methylenebis(4-methyl-6-t-butylphenol), butylated reaction product of p-cresol and dicyclopentadiene, t-butylhydroquinone and the like. Representative of the phosphite class are compounds such as tris(nonylphenyl)phosphite, bis(2,4-di-t-butyl)pentaerythritol diphosphite and the like. Other compounds that may be encapsulated according to the invention include 2,5-di-t-amylhydroquinone: N-phenyl-α-naphthylamine; p-oriented styrenated diphenylamine; octylated diphenylamines: 6-dodecyl-2,2,4-trimethyl-1,2-dihydroquinoline N-phenyl-N'-(1,3-dimethylbutyl)-p-phenylenediamine: diaryl-p-phenylenediamines; dialkyl-p-phenylenediamines; and the like. These antidegradants are known and most are commercially available.

Rubber compounds that utilize polymers subject to deterioration that can be conveniently protected by the encapsulated antidegradant described herein include substituted and unsubstituted, saturated and unsaturated, natural and synthetic polymers. The oxidizable natural polymers include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are α-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene: homopolymers of a conjugated 1,3-diene such as isoprene and butadiene, and in particular, polyisoprenes and polybutadienes having essentially all of their repeat units combined in a cis-1,4-structure: copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene and ethylidene norbornene. The rubber compounds preferably protected by this invention are cis-1,4-polyisoprene (natural or synthetic) polybutadiene and the copolymers of styrene and butadiene and blends thereof.

Those skilled in the art of rubber compounding will appreciate the polymers subject to degradation will be admixtures with conventional rubber compounding ingredients such as oils, carbon black, sulfur, accelerators and the like.

Best Mode

From the art of microencapsulation, it is known that numerous polymers are capable of forming the capsule walls. A study was conducted to determine the solubility of various encapsulating polymers in the molten antidegradant, N-phenyl-N'-(1,3-dimethylbutyl)-para-phenylenediamine (hereinafter AOZ). For each polymer evaluated as a capsule wall candidate, 2 grams of polymer were placed with 10 grams of AOZ in a 50 ml glass beaker. The beakers were placed in an oven at about 50° C. for 24 hours with the samples removed for examination after 15 minutes and again after 24 hours. The oven temperature was then increased to 70° C. and the samples were examined after 3 hours at this higher temperature.

Samples were then allowed to cool to ambient temperature (about 2 hours) and were examined and replaced in the oven at 70° C. and reexamined after 72 hours. The samples were then removed from the oven, allowed to cool to room temperature, and were again examined after 24 hours. Table I summarizes all the observations.

mer have very different solubilities, spray drying the solution can result in the formation of microcapsules. The second method requires dissolving the encapsulating polymer in a solvent that is a nonsolvent or a poor solvent for the active material or antidegradant. The antidegradant is then dispersed in the encapsulating polymer solution and spray dried.

TABLE I

ENCAPSULATING POLYMER COMPATIBILITY STUDY

| Test Material | After 15 Minutes at 50° C. | After 24 Hours at 50° C.[1] |
|---|---|---|
| Polycaprolactone | No Change (insoluble) | No Change (insoluble) |
| Lexan ®* | No Change (insoluble) | No Change (insoluble) |
| Elvamide ® 8063***** | No Change (insoluble) | No Change (insoluble) |
| Kraton ®** | Homogeneous gel (compatible) | No Change |
| Butvar ®*** | Swollen rubbery gel/fluid | No Change |
| Parlon ®**** | Gummy bottom layer (partially soluble) | Stringy, gummy |
| Parlon ® P20 | Gummy bottom layer (partially soluble) | Stringy, gummy |
| Cellulose Acetate (C 398-10) | Grainy suspension/dispersion | No Change (partially soluble) |
| Zein (corn protein) | Grainy suspension/dispersion | No Change (partially soluble) |
| Zinc Stearate | Floating white powder (insoluble) | Powder disperses with stirring (soluble) |

[1]After an additional 3 hours in the oven, but at 70° C., no changes were observed except for polycaprolactone which melted, forming a separate layer. After 72 hours at 70° C., no further changes observed. Upon examinaton after 24 hours at room temperature, the CA 398-10 was grainy/crusty and the Kraton was a hard, "dry" cake. The others did not solidify and appeared similar to the 24 hour/50° C. observations.
*Trademark for thermoplastic carbonate-linked polymer produced by reaching bisphenol A and phosgene.
**Trademark for a styrene-butadiene elastomer.
***Trademark for polyvinyl butyral resins.
****Trademark for chlorinated rubber.
*****Trademark for a nylon resin.

The wide range of solubility of the AOZ prevents the use of the organic phase separation microencapsulation technique while the fluidized bed techniques yield excessively large capsules. Microencapsulation by coacervation using water soluble proteins and polymers is precluded as the capsule walls would be too water sensitive, which is undesirable for use in rubber compounding. Other encapsulation techniques, such as interfacial polymerization or polycondensation, are also undesirable due to the reactive nature of antidegradants which might be changed or interfered with during the polymerization reaction. After investigating these possibilities, the inventors herein concluded that spray drying would be the encapsulation process of preference.

Several approaches to spray drying or spray congealing techniques were used to produce microcapsules. The first method requires dissolving both the encapsulating polymer and the active material (antidegradant) in a common solvent system and spray drying the solution. If the antidegradant and the encapsulating polymer have very different solubilities, spray drying the solution can result in the formation of microcapsules.

A total of 8 primary spray drying runs were attempted. Elvamide ® and Lexan ® were chosen as candidate wall polymers because of their observed stability in the molten AOZ. Kraton ® was chosen in combination with another polymer because of its apparent solubility in the molten AOZ and because the mixture was observed to harden after it cooled to ambient temperatures. The Parlon ® S20 and cellulose acetate (CA 398-10) were selected as candidate wall polymers because they exhibited only slight or partial solubility in the AOZ which suggests an intermediate compatibility. All of the encapsulation systems except the one based on Elvamide ® were spray dried using the common solvent system because of the wide solubility parameters of the AOZ. Elvamide ® in methanol/water is the only system that provided an opportunity to use the dispersion approach. Other water/alcohol soluble polymers were too sensitive and were not investigated. Table II summarizes the formulations used, the spray drying encapsulation trials and the results obtained.

TABLE II

SPRAY DRYING MICROENCAPSULATION TRIALS

| Run Number | Polymer Used Type | gm | AOZ gm | Solvent Used Type | ml | Comments on Product |
|---|---|---|---|---|---|---|
| 1 | Lexan ® 101 | 50 | 50 | CH₂Cl₂ | 500 | Sheets, clumps, slightly tar-like |
| 2 | CA 398-10 | 50 | 25 | Acetone | 600 | Powder appears to be microcapsules (32 gm) |
|  |  |  |  | CH₂Cl₂ | 150 |  |
| 3 | Elvamide ® 8063 | 50 | 50 | MeOH | 500 | Some fibers, mostly sheeted on spray dryer walls |
|  |  |  |  | EtOH | 250 |  |
|  |  |  |  | H₂O | 50 |  |
| 4 | Parlon ® S20 | 50 | 25 | CH₂Cl₂ | 500 | Powder and fine strings appears to be microcapsules (27 gm) |
| 5 | Elvamide ® 8063 | 30 | 30 | MeOH | 450 | Stuck on sides of spray dryer, no recoverable product |
|  |  |  |  | EtOH | 225 |  |
|  |  |  |  | H₂O | 75 |  |
| 6 | Lexan ® 154 | 35 | 50 | CH₂Cl₂ | 700 | Stuck on side of spray dryer, no recoverable product |
|  | Kraton ® G1652 | 25 |  | Toluene | 200 |  |
| 7 | CA 398-10 | 100 | 50 | Acetone | 800 | Same as #2 (125 gm) |
|  |  |  |  | CH₂Cl₂ | 200 |  |

TABLE II-continued

SPRAY DRYING MICROENCAPSULATION TRIALS

| Run Number | Polymer Used Type | gm | AOZ gm | Solvent Used Type | ml | Comments on Product |
|---|---|---|---|---|---|---|
| 8 | Parlon ® S20 | 100 | 50 | $CH_2Cl_2$ | 1000 | Same as #4 (112 gm) |

Only the Parlon ® S20 and the cellulose acetate systems yielded recoverable microcapsules.

Encapsulated AOZ using Parlon S20 and cellulose acetate as the encapsulating polymers (Runs #7 & 8) were mixed into vulcanizable diene-containing elastomer compositions using a two-step Banbury mixing process. Step one involved the preparation of a masterbatch while step two incorporated curing agents and antidegradants into the masterbatch. The following sets forth the formulation:

Preparation of Masterbatch A

| Preparation of Masterbatch A | |
|---|---|
| Component | Parts by Weight |
| Polyisoprene | 40 |
| Polybutadiene | 60 |
| Carbon Black | 50 |
| Extender Oil | 10 |
| Stearic Acid | 2 |
| Antioxidant | 2 |
| Paraffin Wax | 1 |

The curing agents and AOZ microcapsules were then added to the masterbatch as outlined in the following formulation:

Final Mix

| Final Mix | |
|---|---|
| Component | Parts by Weight |
| Masterbatch A | 165 |
| Zinc Oxide | 3 |
| Sulfur | 1.75 |
| Accelerator | 1 |
| Encapsulated AOZ | 3* |

*3 parts by weight of active AOZ for the encapsulated AOZ, thus using run #8, for example, 9 parts of the encapsulated AOZ would yield 3 parts of active AOZ.

The same formulation was used to prepare a control having no AOZ and a control having a free AOZ (not encapsulated).

After standard mixing and sheeting, 15×15×0.19 cm test sheets were cured at 150° C. for about 20 minutes. It is common knowledge that for antiozonants to be effective, they must migrate to the surface of the rubber since $O_3$ is very reactive and will not penetrate significantly into the bulk of the rubber article. Therefore, surface concentrations of the AOZ were determined to monitor AOZ migration as a function of time. This will provide an indication of delayed release.

The specimens were placed in an oven at 38° C. (100° F.) at 90% relative humidity. After 24, 96, and 192 hours, the specimens were removed from the oven and washed with 5 cc of methylene chloride and the washings were analyzed to determine the amount of AOZ present. The specimens were then replaced in the oven and washings conducted at the above stated intervals. Table III sets out levels of AOZ per washing event.

TABLE III

| Relative AOZ Surface Concentrations | | | | |
|---|---|---|---|---|
| | Washing Event (hrs.) | | | |
| Wall Material | 0 | 24 | 96 | 192 |
| None - Free AOZ | 100 | 89 | 64 | 40 |
| Parlon ® S20 | 86 | 64 | 73 | 58 |
| Cellulose acetate | 94 | 91 | 82 | 67 |

These tests confirmed that encapsulation delays the release of the AOZ to the surface which provides for the extended protection of the rubber against ozone attack.

It was determined that the preferred capsule forming polymer was a cellulose acetate. Different grades of cellulose acetate as the encapsulating polymer were investigated. By grade of cellulose acetate is meant polymers of similar degrees of acylation but different degrees of molecular weight and viscosity. The cellulose acetate grades and their respective properties as reported by Eastman Chemical Products Inc. are listed in Table IV.

The grade of cellulose acetate that appears to offer the best capsule system was CA-398-10. This grade of cellulose acetate exhibited the best spray-dry processing parameters of the polymers examined in terms of viscosity and capsule size formation while also providing good release characteristics of the AOZ.

TABLE IV

| CELLULOSE ACETATE GRADES[1] | | | | |
|---|---|---|---|---|
| | Acetyl Content | Molecular Weight | Viscosity | |
| Grade | (%) | (number average) | (sec) | (poise) |
| CA-398-3 | 39.8 | 30,000 | 3.0 | 11.4 |
| CA-398-10 | 39.8 | 40,000 | 10.0 | 38.0 |
| CA-398-30 | 39.7 | 50,000 | 30.0 | 114.0 |
| CA-394-60s | 39.5 | 60,000 | 60.0 | 228.0 |

[1] As reported by Eastman Chemical Products, Inc.

The ratio of core to wall in the microcapsule is an important variable and was investigated by the inventors. Three wall to core ratios were chosen for the evaluations —1:2, 1:1, and 2:1. These ratios were selected to determine the impact of wall to core ratios on release rates. The solvents were selected to provide a range of solubility parameters for the cellulose acetates and evaporation rates, thereby possibly altering capsule formation parameters in the spray drying procedure. In a similar fashion, solvent to encapsulating polymer ratios of 10:1 to 18:1, were selected to examine the effect of solids content on capsule formation.

A matrix chart defines 96 possible encapsulation trials. An experimental design was prepared that allowed for investigation of four variables and was used to select 16 representative encapsulation trials. Table V lists the encapsulation trials from the matrix chart that were conducted during this investigation.

Additional encapsulation trials were conducted to optimize the capsule system through evaluation of other wall-to-core ratios, solvent-to-polymer ratios, solvent systems for the polymers, and spray-dry processing parameters. Based on the results of these trials, the following parameters of the encapsulated antiozonant system were selected. The solvent system that was selected in conjunction with the specific cellulose acetate was a 50/50 mixture of methyl ethyl ketone (MEK) and methylene chloride (MC). The MEK/MC solvent system and the CA-398-10 polymer in a 20:1 solvent:polymer ratio (not included in Table V) appeared to have suitable viscosity and evaporation characteristics which resulted in the formation of a good percentage of capsules in the desired size range (i.e., under 50 microns) The selected polymer/solvent system also exhibited good spray-dry processing parameters and resultant capsule formation in the particular spray dryer used.

The microcapsules of 1:1 and 3:1 wall to core ratios were compounded into a masterbatch rubber as set forth below:

Preparation of Masterbatch B

| Ingredients | Parts by Weight |
| --- | --- |
| Polyisoprene | 40 |
| Polybutadiene | 60 |
| Carbon Black | 50 |
| Extender Oil | 5 |
| Stearic Acid | 1 |

TABLE V
ENCAPSULATION TRIALS CONDUCTED FROM THE MATRIX CHART

| Run Number | Matrix Chart Number | Polymer | Wall to Core Ratio by Weight | Solvent System[1,2] | Solvent to Polymer Ratio |
| --- | --- | --- | --- | --- | --- |
| 9 | 43 | CA-398-10 | 2:1 | Acetone/MC (4:1) | 10:1 |
| 10 | 44 | CA-398-10 | 2:1 | Acetone/MC (4:1) | 15:1 |
| 11 | 42 | CA-398-10 | 1:2 | Butanol/MC (1:1) | 15:1 |
| 12 | 24 | CA-398-3 | 1:2 | Acetone/MC (4:1) | 15:1 |
| 13 | 96 | CA-394-60S | 1:2 | Acetone/MC (4:1) | 15:1 |
| 14 | 8 | CA-398-3 | 2:1 | MEK/MC (1:1) | 15:1 |
| 15 | 25 | CA-398-10 | 2:1 | DAA/MC (1:4) | 12:1 |
| 16 | 86 | CA-394-60S | 2:1 | Butanol/MC (1:1) | 15:1 |
| 17 | 67 | CA-398-30 | 2:1 | Acetone/MC (4:1) | 15:1 |
| 18 | 34 | CA-398-10 | 1:1 | MEK/MC (1:1) | 15:1 |
| 19 | 22 | CA-398-3 | 1:1 | Acetone/MC (4:1) | 15:1 |
| 20 | 54 | CA-398-30* | 1:2 | DAA/MC (1:4) | 15:1 |
| 21 | 64 | CA-398-30 | 1:1 | Butanol/MC (1:1) | 15:1 |
| 22 | 93 | CA-394-60S | 1:1 | Acetone/MC (4:1) | 15:1 |
| 23 | 39 | CA-398-10 | 1:1 | Butanol/MC (1:1) | 17:1 |
| 24 | 17 | CA-398-3 | 1:2 | Butanol/MC (1:1) | 15:1 |
| 25 | 57 | CA-398-30 | 1:1 | MEK/MC (1:1) | 15:1 |
| 26 | 83 | CA-394-60S | 1:2 | MEK/MC (1:1) | 15:1 |
| 27 | 44 | CA-398-10 | 2:1 | Acetone/MC (4:1) | 18:1 |

[1]The volume ratio of the solvents in the mixture is listed in parentheses.
[2]MC = methylene chloride; MEK = methyl ethyl ketone; DAA = diacetone alcohol also known as 4-hydroxy-4-methyl-2-pentanone.
*Run discontinued - system would not spray dry due to solvent system.

The encapsulated AOZ from these trials were evaluated for antiozonant functionality in rubber compounds.

One aspect of the instant invention resides in the discovery that the size of the capsules is a very important consideration in the compounding of rubber articles. Large capsules were found to induce stress cracking in the compounded rubber; therefore, it is necessary to classify or separate the capsules into suitable size fractions. Investigations have indicated that capsules under 50 microns in diameter are suitable for use in rubber compounds.

The following recipe was used when incorporating the AOZ capsules into the masterbatch:

| Ingredients | Parts by Weight |
| --- | --- |
| Masterbatch B | 156 |
| Zinc Oxide | 3.5 |
| Sulfur | 2.25 |
| Accelerator | 0.5 |
| AOZ System | 6 |

The encapsulated AOZ was added at 6 parts by weight of active AOZ on weight of rubber as described previously. The mixing of the ingredients was done on a Banbury mixer and the rubber was then sheeted. The rubber was then cured to a T-90 time at 150° C. and cut into 15×15×0.19 cm test sheets.

The surface concentration of the AOZ after ozone exposure was determined by washing as previously described. The AOZ concentration in the washings was quantitatively determined by high pressure liquid chromatography (HPLC) using an absorbance detector. The results are shown in Table VI.

TABLE VI

| | Surface AOZ Concentration* | | | | | |
|---|---|---|---|---|---|---|
| | Days in Ozone Chamber** | | | | | |
| | 5 | 10 | 15 | 20 | 25 | 30 |
| Free AOZ | 320 | 280 | 400 | 200 | 150 | 50 |
| Encapsulated AOZ (1:1 wall/core) | 300 | 300 | 360 | 210 | 120 | 50 |
| Encapsulated AOZ (3:1 wall/core) | 200 | 280 | 320 | 300 | 200 | 150 |

*Units are surface AOZ concentration in μg/cm².
**ASTM D3395 using a cycled ozone on/off procedure.

As evidenced from Table VI, the encapsulation of the AOZ using cellulose acetate as the wall polymer at a 3:1 wall/core ratio delays the release of the AOZ and its subsequent migration to the surface of the rubber article. The delayed release of the AOZ is evidenced by the analysis performed on the washed test sheets containing the encapsulated AOZ at the 3:1 ratio. Encapsulated AOZ becomes available on the surface of the rubber article at a slower rate than the unmodified or free AOZ.

TABLE VII

| | Ozone Resistance* | | | | | |
|---|---|---|---|---|---|---|
| | Days Exposure to Ozone** | | | | | |
| | 5 | 10 | 15 | 20 | 25 | 30 |
| Free AOZ*** | 0 | 0 | 0 | 18 | 48 | 60 |
| Encapsulated AOZ (1:1 wall/core) | 0 | 0 | 4 | 24 | 48 | 60 |
| Encapsulated AOZ (3:1 wall/core) | 0 | 4 | 12 | 12 | 24 | 48 |
| Encapsulated AOZ (1:1) plus 2.5 phr free AOZ | 0 | 0 | 0 | 14 | 40 | 60 |
| Encapsulated AOZ (3:1) plus 2.5 phr free AOZ | 0 | 0 | 0 | 0 | 16 | 28 |

*Values are a crack rating estimated as the product of crack size and crack density.
**ASTM D3395 using a cycled ozone on/off procedure.
***All compounds contained 6 phr total AOZ (free plus encapsulated).

Ozone testing results shown in Table VII indicate that encapsulation of the AOZ at greater than a 1:1 wall to core ratio delays the release of the AOZ and thus makes necessary the incorporation of unencapsulated, free, or unmodified AOZ into the rubber formulation to provide initial protection. The unmodified or free AOZ provides immediate and short term ozone resistance while the encapsulated AOZ provides longer term ozone resistance. Alternatively, encapsulated materials with different release rates or wall to core ratios may also achieve the same effects.

Microcapsules of varying wall to core ratios were mixed into the recipe described above using Masterbatch B. The ozone tests shown in Table VIII indicate that a 3:1 wall to core ratio provided the optimum release characteristics. The 3:1 ratio offered an improvement over a 2:1 ratio; however, an increase to 4:1 did not offer enough of a significant improvement in release properties to warrant the cost of additional polymer while 1:1 ratios show little if any delayed release activity.

TABLE VIII

| | Effect of Wall/Core Ratios | | | | | |
|---|---|---|---|---|---|---|
| | Days in Ozone Chamber** | | | | | |
| Wall/Core Ratio* | 5 | 10 | 15 | 20 | 25 | 30 |
| Free AOZ | | | | | | |
| Cracking*** | 0 | 0 | 0 | 18 | 48 | 60 |
| Surface Concentration**** | 320 | 280 | 400 | 200 | 150 | 50 |
| 1:1 | | | | | | |
| Cracking | 0 | 0 | 0 | 14 | 40 | 60 |
| Surface Concentration | 300 | 260 | 320 | 240 | 140 | 60 |
| 2:1 | | | | | | |
| Cracking | 0 | 0 | 0 | 10 | 42 | 60 |
| Surface Concentration | 310 | 300 | 320 | 210 | 170 | 70 |
| 3:1 | | | | | | |
| Cracking | 0 | 0 | 0 | 0 | 16 | 28 |
| Surface Concentration | 300 | 300 | 300 | 280 | 240 | 210 |
| 4:1 | | | | | | |
| Cracking | 0 | 0 | 0 | 0 | 12 | 32 |
| Surface Concentration | 250 | 350 | 310 | 300 | 210 | 230 |

*All compounds containing encapsulated AOZ contain 2.5 phr free AOZ and 6 phr total AOZ - ratios are by weight.
**ASTM D3395 using a cycled ozone on/off procedure.
***Crack rating estimated as the product of crack size and crack density.
****Surface AOZ concentration in μg/cm².

Industrial Applicability

The rubber industry is constantly searching for methods to lessen or eliminate the degradation of rubber articles. The instant invention fills this need in the industry with a product and process that heretofore was unknown.

Through the instant invention a rubber article is afforded outstanding protection from ozone and oxygen attack by the slow, controlled release of an antidegradant.

While the illustrative embodiments of the invention have been described with particularity, it should be understood that various modifications will be apparent to and can be readily made by those skilled in the art without departing from the spirit and scope of the invention. Accordingly, it is not intended that the scope of the claims appended hereto be limited to the examples and description set forth herein, but rather that the claims be construed as encompassing all the features of patentable novelty which reside in the present invention, including all features which would be treated as equivalents thereof by those skilled in the art to which the invention pertains.

What is claimed is:

1. A composition comprising a diene containing polymer and a microencapsulated antidegradant; wherein the walls of the microcapsule are formed of a polymer selected from the group comprising cellulose acetate and chlorinated rubber; and wherein said microencapsulated antidegradant has a diameter of 50 microns or less and a wall to core ratio of from 1:1 to 4:1 by weight.

2. A composition according to claim 1 wherein the diene containing polymer is selected from the group comprising natural rubber, polyisoprene, polybutadiene, polychloroprene, copolymers of isoprene and butadiene, copolymers of styrene and butadiene, copolymers of acrylonitrile and butadiene, copolymers of acrylonitrile and isoprene and blends thereof.

3. A composition according to claim 1 wherein the wall to core ratio is from 2:1 to 3:1.

4. A rubber article comprising the composition according to claim 1.

5. An improved rubber vulcanizate, said rubber vulcanizate is prepared by combining:
(A) a vulcanizable diene containing elastomer with a microencapsulated antidegradant, said microencapsulated antidegradant being prepared by a process comprising:
(1) admixing the antidegradant with an encapsulating polymer:
(2) spray drying the resulting mixture:
(3) isolating the microencapsulated antidegradant;
(B) curing the vulcanizable diene elastomer/microencapsulated antidegradant mixture.

6. A composition according to claim 1 wherein said antidegradant is selected from the group consisting of phenolics, phosphites, thioesters, amines, quinolines or mixtures thereof.

7. A composition according to claim 6 wherein said phenolic antidegradant is selected from the group consisting of monophenols, bisphenols, thiobisphenols, polyphenols, and hydroquinone derivatives.

8. A composition according to claim 5 wherein said antidegradant is selected from the group consisting of phenolics, phosphites, thioesters, amines, quinolines or mixtures thereof.

9. A composition according to claim 8 wherein said phenolic antidegradant is selected from the group consisting of monophenols, bisphenols, thiobisphenols, polyphenols, and hydroquinone derivatives.

* * * * *